(12) United States Patent
van Eyken et al.

(10) Patent No.: US 10,142,817 B2
(45) Date of Patent: Nov. 27, 2018

(54) TECHNIQUE TO MINIMIZE INTER-ELEMENT BANDWIDTH REQUIREMENTS DURING DATA SYNTHESIS ON LARGE NETWORKS

(71) Applicant: SRI INTERNATIONAL, Menlo Park, CA (US)

(72) Inventors: Anthony P. van Eyken, Morgan Hill, CA (US); John D. Kelly, Grass Valley, CA (US)

(73) Assignee: SRI International, Menlo Park, CA (US)

( * ) Notice: Subject to any disclaimer, the term of this patent is extended or adjusted under 35 U.S.C. 154(b) by 368 days.

(21) Appl. No.: 14/861,861

(22) Filed: Sep. 22, 2015

(65) Prior Publication Data

US 2016/0088088 A1    Mar. 24, 2016

Related U.S. Application Data

(60) Provisional application No. 62/053,971, filed on Sep. 23, 2014.

(51) Int. Cl.

| | |
|---|---|
| *H04L 29/08* | (2006.01) |
| *H04W 4/38* | (2018.01) |
| *H04H 20/38* | (2008.01) |
| *H04N 21/2343* | (2011.01) |
| *H04N 21/2665* | (2011.01) |
| *H04W 4/02* | (2018.01) |

(52) U.S. Cl.
CPC .............. *H04W 4/38* (2018.02); *H04H 20/38* (2013.01); *H04L 67/10* (2013.01); *H04N 21/234363* (2013.01); *H04N 21/2665* (2013.01); *H04W 4/02* (2013.01)

(58) Field of Classification Search
CPC ... H04L 67/10; G06F 17/30873; H04H 20/38; H04N 21/234363; H04N 21/2665
See application file for complete search history.

(56) References Cited

U.S. PATENT DOCUMENTS

| | | | |
|---|---|---|---|
| 6,580,973 B2 * | 6/2003 | Leivian | B60R 16/0231 701/1 |
| 7,266,088 B1 * | 9/2007 | Virgin | H04L 43/026 370/235 |
| 8,597,093 B2 * | 12/2013 | Engelberg | G06F 19/3481 463/1 |
| 8,734,296 B1 * | 5/2014 | Brumback | G16H 40/63 482/8 |

(Continued)

*Primary Examiner* — Chirag R Patel
(74) *Attorney, Agent, or Firm* — Shumaker & Sieffert, P.A.

(57) ABSTRACT

A method of performing a task by a sensor node in a sensor network includes receiving, at a sensor node, a packet from a central source on the sensor network, extracting a network-wide task to be completed from the packet, determining a portion of the task to be completed by the sensor node, the portion of the task comprising an operation to be performed by the sensor, and performing the portion of the task at the sensor node. A system includes a central source, a network of sensor nodes in communication with the central source, each sensor node having a port for receiving and sending packets, a sensor, a local memory, and a processor to extract a network-wide task from the packet, determine a portion of the task to be completed by the sensor node, and complete the portion of the task.

20 Claims, 5 Drawing Sheets

(56) References Cited

U.S. PATENT DOCUMENTS

| | | | | |
|---|---|---|---|---|
| 8,842,003 B2 * | 9/2014 | Huston | ................. | G06Q 50/01 340/539.13 |
| 9,001,229 B2 * | 4/2015 | Goh | ................... | H04N 13/0003 348/218.1 |
| 2002/0050518 A1 * | 5/2002 | Roustaei | ............ | G06K 7/10544 235/454 |
| 2009/0213245 A1 * | 8/2009 | Harper | .................... | G11B 27/11 348/231.3 |
| 2010/0106397 A1 * | 4/2010 | Van Essen | ............. | G01C 21/34 701/532 |
| 2013/0081032 A1 * | 3/2013 | Levien | ............. | G06Q 10/06311 718/102 |
| 2013/0128786 A1 * | 5/2013 | Sultan | ................ | H04W 52/0238 370/311 |
| 2014/0156228 A1 * | 6/2014 | Molettiere | ............ | G06F 19/322 702/189 |

* cited by examiner

TECHNIQUE TO MINIMIZE INTER-ELEMENT BANDWIDTH REQUIREMENTS DURING DATA SYNTHESIS ON LARGE NETWORKS

RELATED APPLICATIONS

This application claims priority to U.S. Provisional Patent Application No. 62/053,971, filed Sep. 23, 2014, and is related to U.S. Provisional Patent Application 61/790,002, both of which are incorporated by reference here in their entirety.

BACKGROUND

The number of systems that involve multiple sensors or other data sources from which information streams combine together to produce a desired data product continues to increase. Examples include solid-state camera detector arrays, synthesis telescopes, networks of traffic sensors, location information from mobile phones, and antenna arrays. The data products may include simple integration, data compression, and data combinations in multiple dimensions according to arbitrary rules, and may also include local operations where the required product results from behavior of the nodes. In this last case, the nodes may receive messages or tasks from a central processing facility as well.

A particular subset of such systems does not have a single desired data product, but combines the data in multiple ways to provide multiple, distinct data products. Examples include distributed passive radar arrays and phased array radars, both of which need to track indeterminate and time-varying target populations, and networks of surveillance cameras that may need to track multiple disparate objects of interest like people and vehicles simultaneously.

Generally, transferring the data from all of the data providers to a central processing unit addresses all of the data assimilations. The central processing facility applies the appropriate algorithms to extract the desired data product. In the other direction, the central processing facility transfers messages to all of the data recipients to cause the desired behavior. In either case, the data transfer requirements will overwhelm the system, either between the nodes and the central processing facility, or within the processor or processors. The addition of additional processors may not alleviate the bandwidth requirements because the data still needs to traverse the connections to get to the processors and may result in transferring the bandwidth requirements to other, less tractable areas of the network.

One approach uses very high bandwidth, and therefore high cost, connections between the nodes and the central processor. For example, synthesis radio telescopes use high-bandwidth optical connections between the antennas and the processing facility, or ultra-fast communication links between processors in supercomputing installations.

Alternatively, wider bandwidth communications and/or multiple processors or networks may handle small numbers of data products, but these solutions rapidly become untenable, if not impossible, at any cost. For example, where the system requirement needs to track every potentially hostile target, any inability to add a new target to the track can be fatal.

DETAILED DESCRIPTION OF THE EMBODIMENTS

To alleviate the bandwidth requirements in systems having multiple sensors or other data sources, one can distribute the task across the network such that each node can operate on the portion of the task for that particular node, update the packet as needed, then send the packet to another node or back to a central processor. This transfers the work of analyzing the data from the sources from the central processor to the individual nodes, and reduces the bandwidth to one packet traversing the network for a particular task.

Figure 1:
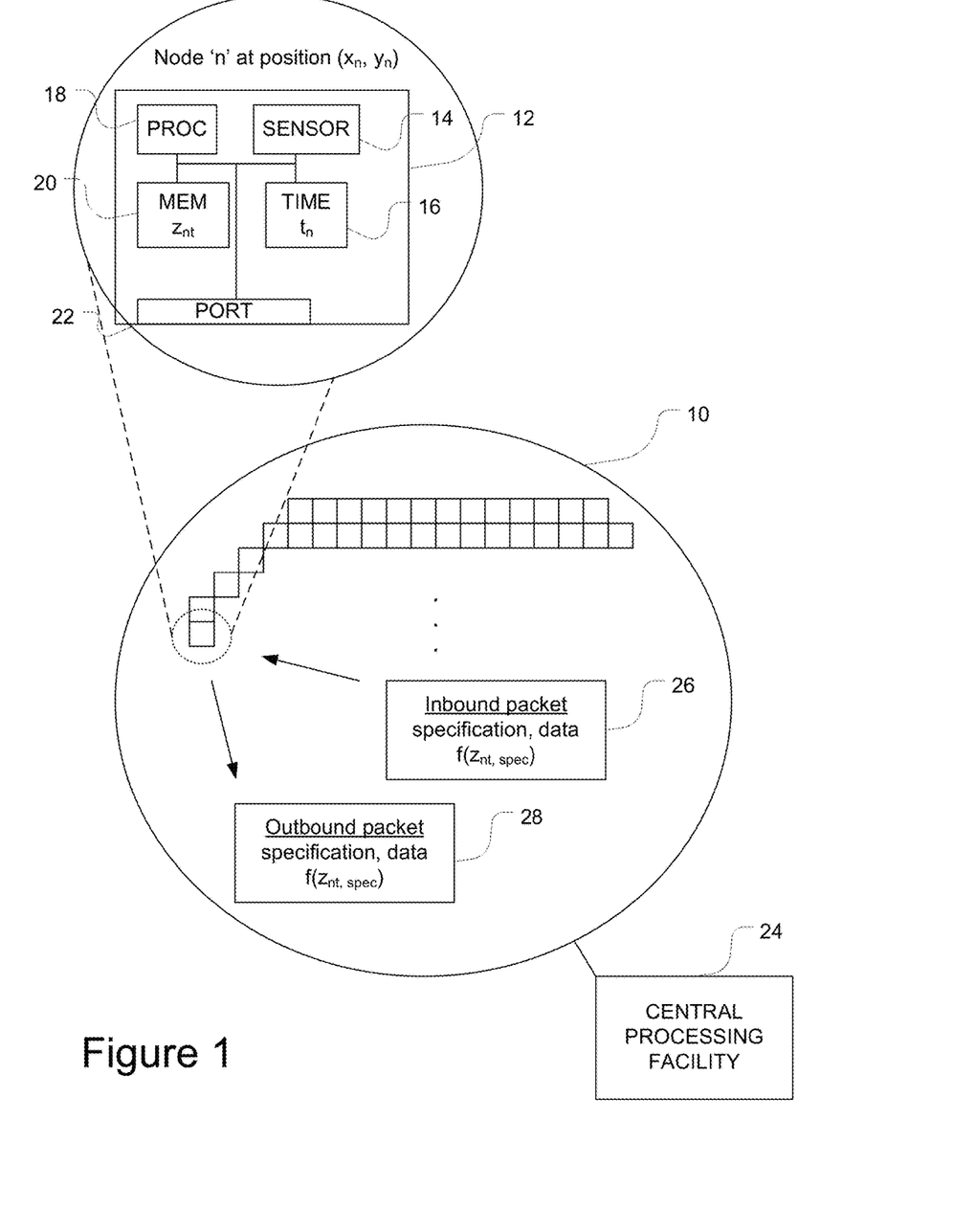
FIG. 1 shows an embodiment of a multi-sensor node system.

FIG. 1 shows an example of a multi-sensor network. In this example, each node 12 consists of a sensor 14, some processor or other circuitry 18 that can perform some computations, a local memory 20, a port 22 and a local time standard 16. One should note that the use of the term 'processor' as used here encompasses any type of computational capability, whether embodied in an actual processing unit, or simpler circuitry that can perform basic mathematical functions.

Similarly, one should note that while the node 12 includes a sensor, the node 12 may consist of a processing hub for multiple sensors, such as where one hub services some set of sensors. In some embodiments, the sensors may act as data sources to provide information for performance of a particular task or to answer a particular query, in others the sensors may act to locate a device within a larger context to allow the node to perform its portion of an overall task with no transmission upon completion.

The term 'task' as used here means a task for the entire network to accomplish. It may also be referred to as the goal, and will typically reach the nodes as part of a specification within an inbound packet. The specification may include one or more of many different types of things, from a mathematical formula that requires sensor data, to an image for display.

The central processing facility 24 that sends the packet may consist of a processor running on a computer, a server or other computing device, may consist of a large array of computers, etc. The central processing facility may also be a source of data, such as an image to display. It acts as a source on the sensor network, of either data or processing tasks.

For example, in FIG. 1, the particular example has an array of antenna elements, such as 12, more than likely in a phase array, in which the antennas follow a predetermined pattern of interference. In this particular embodiment, the antenna elements have received signals and stored the data from those signals in the local memory. The central processing facility has a required beam specification from the phased array, defined in terms of a summation of data streams from selected ones of individual antenna elements with coefficients and phase delays depending upon the position of the elements to a reference point and a particular time.

The central processing facility sends a packet 26 out into the network with the description of the required beam shape, or a list of elements from which it needs data, and may include an operation that needs the data, such as summation, etc. The operation may require the node to append its data to the payload of the packet, or perform a computation using its data in addition to the other data, etc. Upon processing the packet, the node then updates the packet to create an updated packet 28 and routes the packet to another node on the list or to a node at a particular position, etc. In some instances, the node may determine it is the final node and send the packet back to the central processing facility.

In processing the packet in this embodiment, the node 12 may read the description or specification, calculates how the data stream should be incorporated, retrieves the appropriate data for the designated time from its local memory 20, applies the calculated coefficients and/or phase/time shifts and places the result in the payload of the now-updated packet. If the node is not the first to be visited, the payload may already contain a partial data product to which the node adds its own data, with the appropriate coefficients and shifts, and replaces the payload with the new product estimate.

If the packet is routed according to a set of desired locations or nodes, and the node is not one of the nodes from which data is desired or that the condition required by the inbound data packet is not true, the node just routes the data packet with an untouched payload. However, it may alter the header or other metadata of the packet to reflect that the node handled the packet.

In this embodiment, when the packet has traversed all of the network or the desired portion of the network, only the data of the data product with associated headers and metadata has traversed the network. The bandwidth requirements for such a packet are far lower than each of the sensor nodes transmitting its data to the central processing facility. The raw data never traverses the network, drastically reducing the amount of bandwidth needed. This may allow the central processing facility to send multiple packets to multiple nodes to start several tasks, or to divide one task into multiple pieces.

Figure 2:
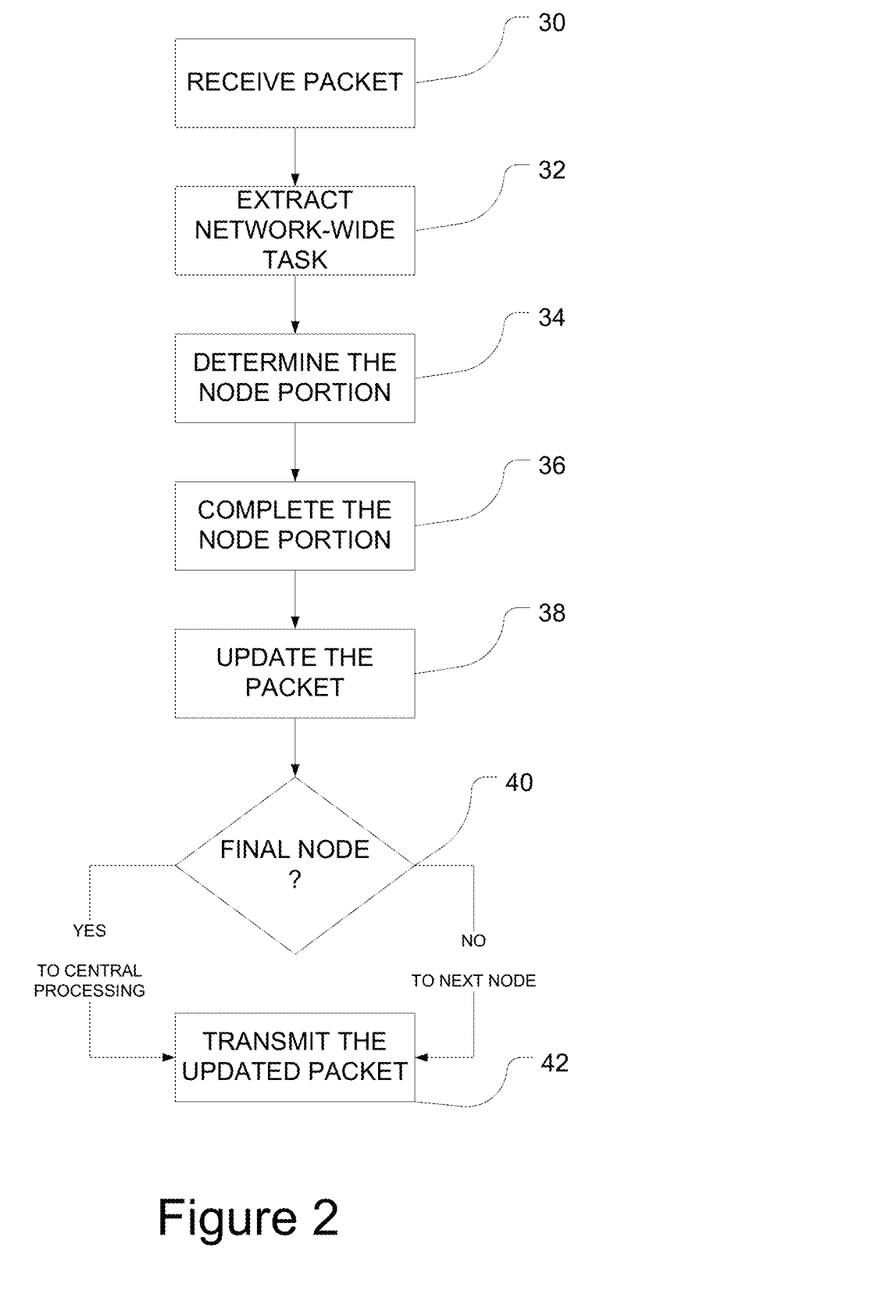
FIG. 2 shows a flowchart of an embodiment of inter-node transmissions.

FIG. 2 shows a flowchart of this particular type of process from the perspective of a node. At 30 the node receives the packet and extracts the network-wide task, or specification, at 32. The node then determines its own role in fulfilling the task, finding a node portion of the task at 34. It is important to note that unlike many models of distributed computing, the node determines its own role, it does not receive a divided portion of an overall task to perform that has already been identified by the central processing facility. Because the nodes are either their own data sources, or know something about themselves, like location, or both, they self-determine their role to fulfill in the task accomplishment.

The node then completes the portion of the task that it has determined it should at 36. As discussed above, the portion of the task may be to not perform a task, depending upon the nature of the way the packets are routed. If the packet does not identify a specific list of nodes to participate, but instead relies upon time, position or other information in the specification that will allow the node to determine whether or not it will be involved, the packet may come from any node that is routing it, rather than being specifically addressed to the particular node. These packets will at least need to be updated at 38 to include the node information, but the payload will remain untouched by this node.

In some embodiments, such as where the sensors consist of cameras performing monitoring of hostile intentions, or even satellites looking for nuclear explosions, the specification may define a threshold or other value. Once the data in the packet meets that requirement, the node may determine it is the final node and return the packet to the central processing facility immediately.

In some embodiments, the originator does not need to communicate with every sensor, recover data from every sensor, nor keep track of how many sensors reside in or function in the network. In one embodiment, for example, the packet includes an algorithm or other specification, with a list of members visited, and a payload consisting of a mean and a standard deviation of the sensor values all visited members. The length of the members list will indicate how many members have contributed to the payload.

The specification instructs the current member to update the mean and the standard deviation in the payload using its own sensor value and add its own identifier to the list of members visited. The specification will then direct the sensor to test if its own sensor value is more than some predetermined number of standard deviations from the mean. If the sensor value of the current value is not outside that number of standard deviations, the node passes the packet on to the next packet. If the sensor value is outside the number of standard deviations, then an event, such as a nuclear explosion, has occurred and the packet it returned to the central processing unit immediately.

In terms of FIG. 2, the updated packet transmission may then not automatically go to the next node. Depending upon the threshold or other condition set out in the packet, such as the standard deviation above, the node tests to see if it is the final node for that packet. If the threshold is not met, meaning that the condition is not met or the results are not yet sufficient, the answer is 'no' and the updated packet is routed to a next node. If the answer is yes, then the packet is transmitted back to central processing.

In the above embodiments and the discussion of FIG. 2, the task requires a transmission of an updated packet. However, in some instances, the performing of the task does not involve any kind of transmission from the node after further processing. The node may forward the packet on after storing the task in the local memory, or it may just receive the task from a centralized processing facility directly. In these embodiments, the process will end at the completion of the node portion at 36.

Figure 3:
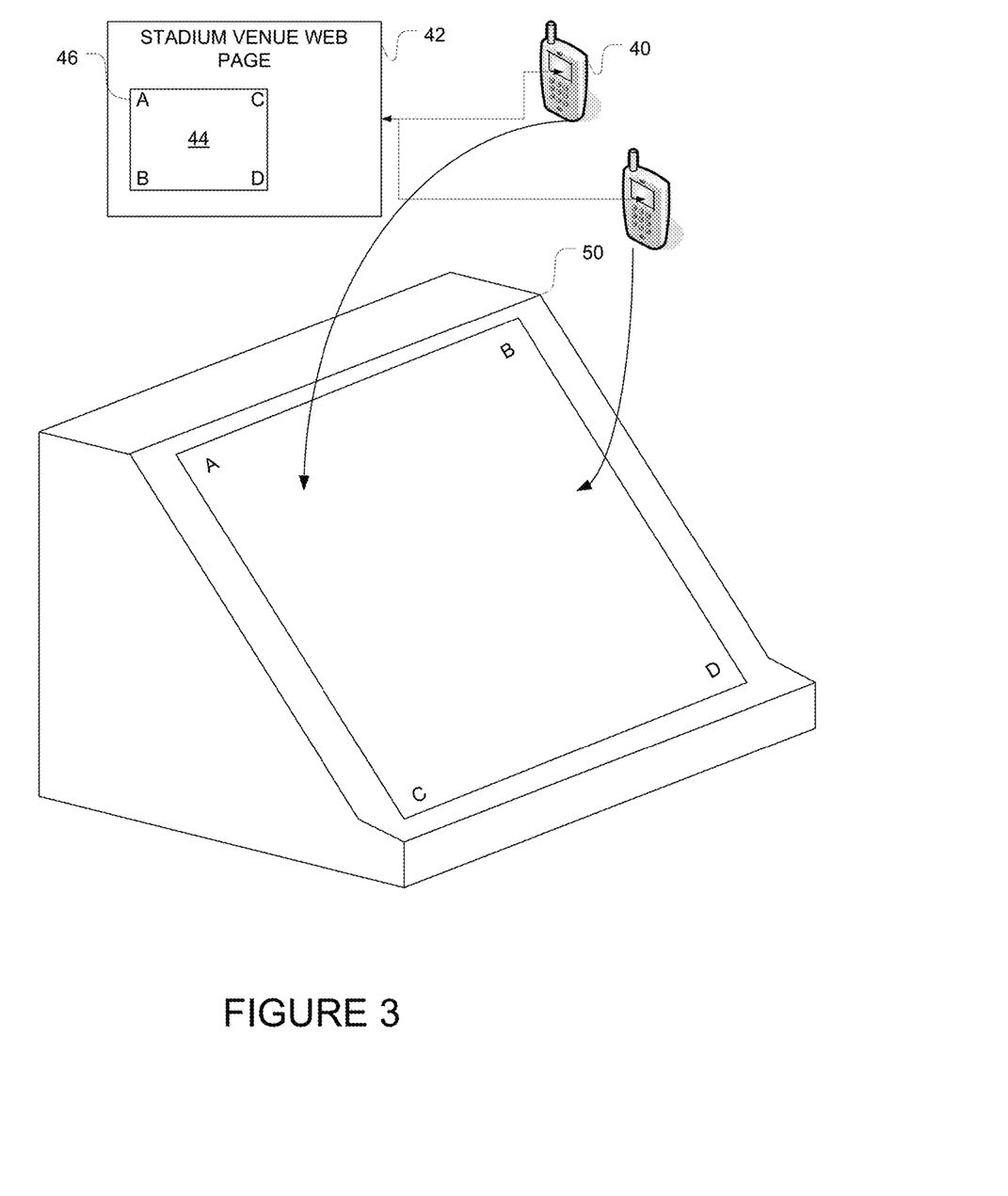
FIG. 3 shows an embodiment of a crowd-scale image display.

For example, as shown in FIG. 3, there is a sporting event or other large attendance event at a venue 50. The attendees will more than likely have cell phones, and more than likely many of them will be GPS-enabled phones with some computational computing capability. When the users get to the venue, they may receive a proximity broadcasted text message or there are signs up, telling them to go to the venues web page to 'register' their device. This may involve the user providing their cell phone number to the venue, or allowing them to download an app from the web page 42.

When an event occurs, such as a touchdown at a football game, user cell phones such as 40 that are active, that is both powered on and charged sufficiently, will receive an image 44. The image may also specify some sort of reference points such as its corners such as 46. The user's phone can then use its GPS sensor to determine its location in the overall image and what color it should display, as well as any variations over time, like blinking patterns, etc. The user's phone then may signal the user to hold the phone up as part of a larger image that says something like "TOUCHDOWN" across the width of the venue 50.

In these embodiments, the node does not perform any further processing or forward any packets, but it still determines its role in the overall task and performs that task according to its determination.

Figure 4:
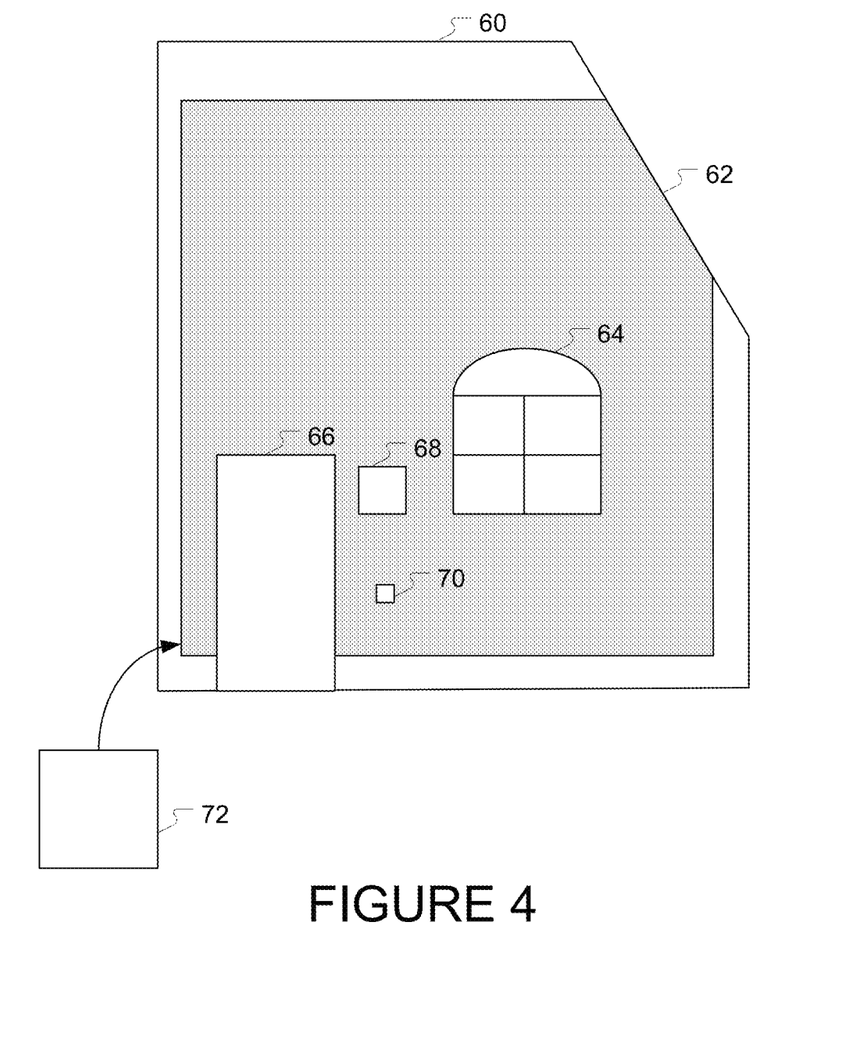
FIG. 4 shows an embodiment of a self-configuring surface display.
Figure 5:
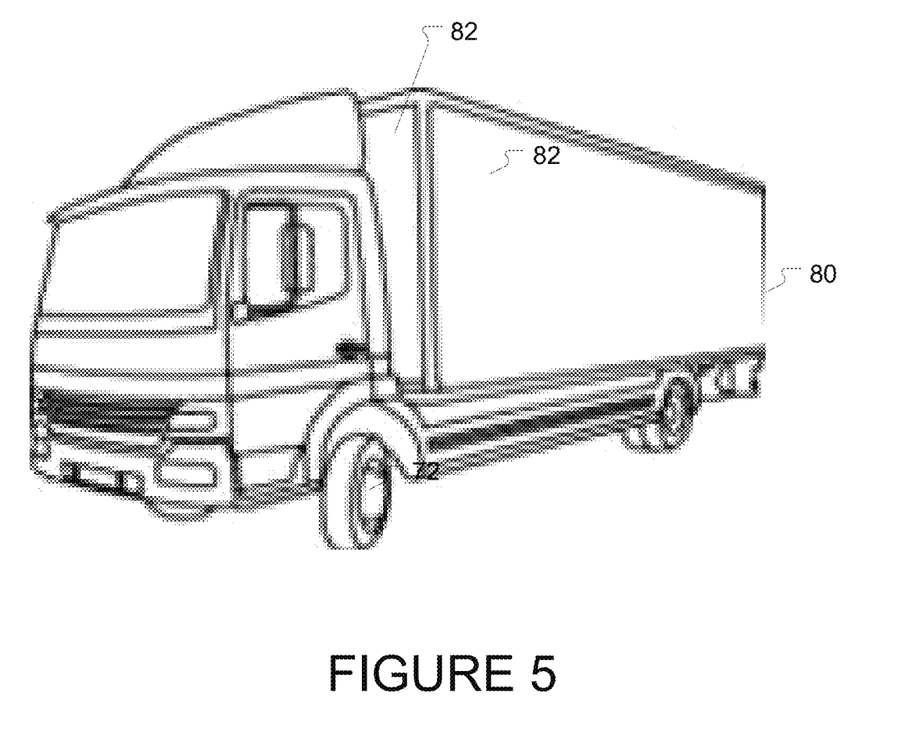
FIG. 5 shows an embodiment of a mobile self-configuring display.

In other embodiments, the nodes may consist of 'smart' pixels. A 'smart pixel' as used here, means an autonomous pixel for use in a low-bandwidth pixel network. These pixels may reside in a display such as smart pixel wallpaper or smart wrap that can receive an overall image and a display mapping to all the pixels. Each pixel then uses a location sensor to determine its position in the image, pattern, etc., and displays the appropriate information. This type of display has no need to know or allow for obstructed or missing irregular areas on a building 60, such as roof lines 62, windows 64, posted notices or other hangings such as 68, the door 66, etc. The smart pixels just determine their contributions and make them. This type of display is easily scalable and adaptable to any type of display, such as on a mobile platform, such as truck 80 having 'smart' wrap 82 that covers all of the surfaces of the truck without regard to corners, trim or other surface irregularities. The truck in this example could configure the display to match the function of the truck on that particular job, or to provide advertising space.

In the above embodiments, the central processing facility does not need to know or does not need to care about any nodes that are out of the network, whether that node coincides with a window on a building used as a display surface, or a user's cell phone that is off and in a user's pocket.

Additionally, since the sensor nodes reside in a network, some limited networking protocols could be instituted by the sensor nodes to further manage the transmission of packets between nodes according to traffic protocols, load distribution, etc.

In this manner, it is possible to employ localized processing combined with sensor information to perform distributed tasks in a sensor network. The sensor information may provide the local processor with information used to perform a portion of an overall task, or allow it to locate itself in a larger context. In either case, the bandwidth requirements are reduced for the sensor network.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of performing a task in a sensor network, comprising:
   receiving, at one of a plurality of sensor nodes of the sensor network, an inbound packet from another location on the sensor network, wherein a sensor node includes a sensor and a processor;
   extracting from the inbound packet a network-wide task to be completed by the sensor node and at least one other sensor node, the network-wide task having task portions for the sensor node and the at least one other sensor node;
   determining a portion of the task to be completed by the sensor node, wherein the sensor node determines how the sensor node performs the portion of the task;
   completing the portion of the task at the sensor node by performing an operation on data collected by the sensor node;
   at the sensor node, inserting the results into the inbound packet to produce an updated packet; and
   transmitting the updated packet from the sensor node to at least one other location on the sensor network.

2. The method of claim 1, wherein the network-wide task to be completed comprises collecting data from selected ones of the plurality of the sensor nodes.

3. The method of claim 2, wherein determining a portion of the task to be completed comprises determining that the portion of the task to be completed is to perform a mathematical computation on data collected by the sensor node at a particular time.

4. The method of claim 3, wherein inserting the results into the inbound packet comprises adding the results of the mathematical computation performed on the data collected by the sensor node to the inbound packet.

5. The method of claim 1, wherein transmitting the updated packet comprises:
   determining whether the sensor node is a final node for which the packet was intended;
   transmitting the packet to a central processing facility, if the sensor node is the final node.

6. The method of claim 5, further comprising transmitting the packet to at least one other sensor node of the plurality of sensor nodes, if the sensor node is not the final node.

7. The method of claim 5, wherein determining the sensor node is a final node for which the packet is intended comprises determining if all nodes for which the packet was intended have contributed to the packet.

8. The method of claim 5, wherein determining the sensor node is the final node for which the packet is intended comprises:
   determining whether the task has been completed sufficient to a threshold provided in the packet; and
   if the task has been completed, determining that the node is the final node.

9. A method of performing a task by a sensor node in a sensor network, comprising:
   receiving, at a sensor node, an inbound packet from a central source on the sensor network, wherein the sensor node includes a sensor and a processor;
   extracting a network-wide task to be completed from the inbound packet for the sensor node and others of the plurality of sensor nodes;
   determining a portion of the task to be completed by the sensor node, the portion of the task comprising an operation to be performed by the sensor; and
   performing the portion of the task at the sensor node.

10. The method of claim 9, wherein operation to be performed comprises performing an operation on data collected by the sensor, the method further comprising:
    at the sensor node, inserting the results into the inbound packet to produce an updated packet; and
    transmitting the updated packet from the sensor node to at least one other location on the sensor network.

11. The method of claim 10, further comprising establishing communication between the sensor node and the central processing facility.

12. The method of claim 11, wherein comprising establishing communication between the sensor node and the processing facility comprises one of downloading an application for a venue in which the central processing facility resides, or registering with the source on the sensor network through a web page.

13. The method of claim 10, wherein receiving, at a sensor node, the inbound packet comprises receiving a signal on a GPS-enabled portable device.

14. The method of claim 13, wherein extracting a network-wide task comprises extracting an image.

15. The method of claim 14, wherein:
 determining the portion of the task comprises using GPS to locate the portable device relative to the image; and
 performing the portion of the task comprises displaying a portion of the image based upon a location of the portable device.

16. The method of claim 10, wherein extracting the network-wide task comprises extracting an image and a mapping of pixels to a network of smart pixels.

17. The method of claim 16, wherein determining the portion of the task comprises each smart pixel determining the location of the smart pixel within the image and completing the portion of the task comprises displaying image information for the location on the smart pixel.

18. A system, comprising:
 a central source;
 a network of sensor nodes in communication with the central source, each sensor node comprising:
  a port for receiving and sending packets;
  a sensor;
  a local memory; and
  a processor configured to execute instructions extracted from inbound packets received from the central processing facility, the instructions to cause the processor to:
   extract a network-wide task from the inbound packet, wherein the network-wide task includes portions for the sensor node and others of the plurality of sensor nodes;
   determine the portion of the task to be completed by the sensor node; and
   complete the portion of the task, wherein the node determines how the node completes the portion of the task.

19. The system of claim 18, wherein the sensor node also includes a time references, wherein the network-wide task has a time component.

20. The system of claim 18, wherein the sensor node comprises one of an antenna array element, a portable device with a GPS, a camera, and a smart pixel.

* * * * *